UNITED STATES PATENT OFFICE.

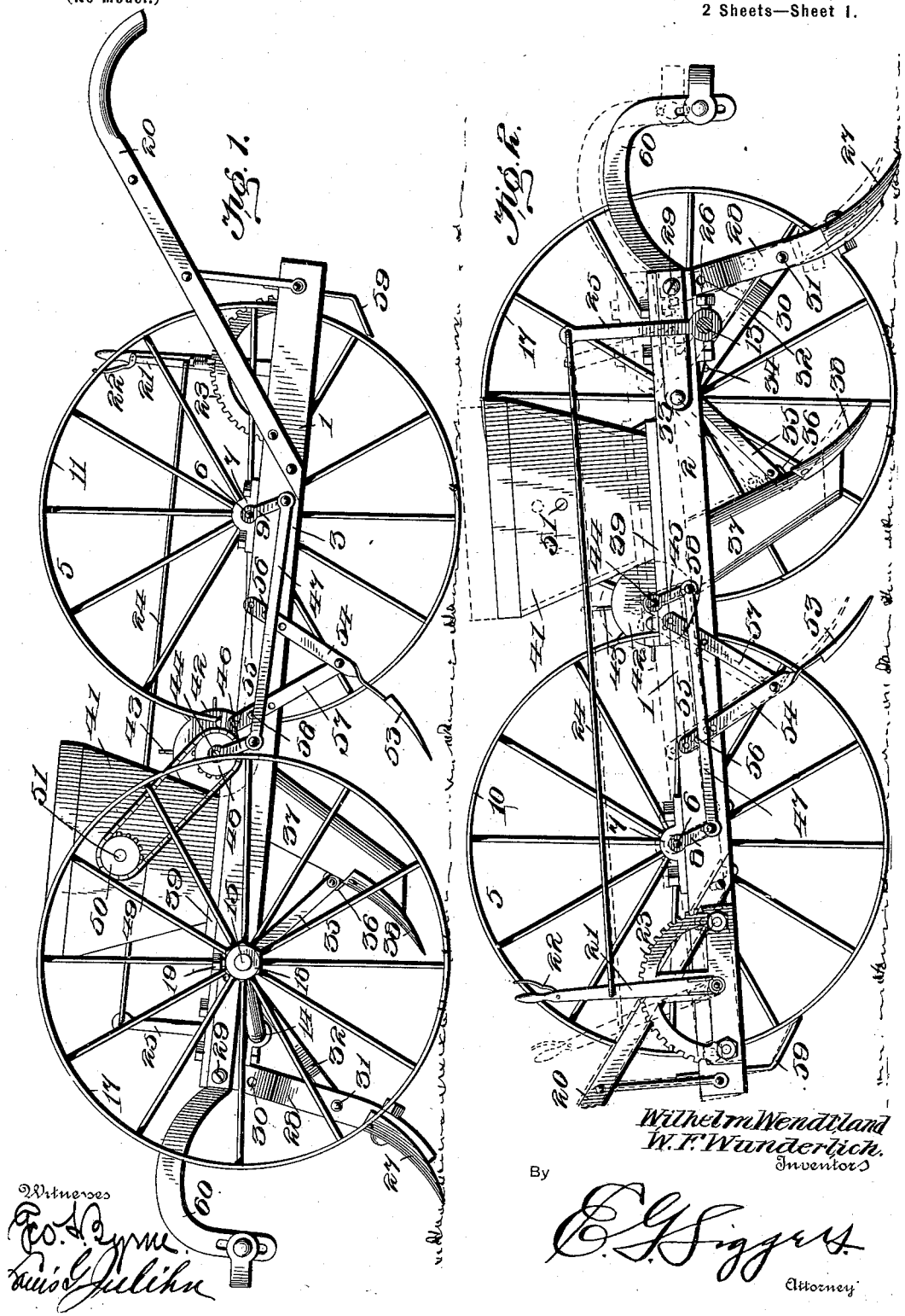

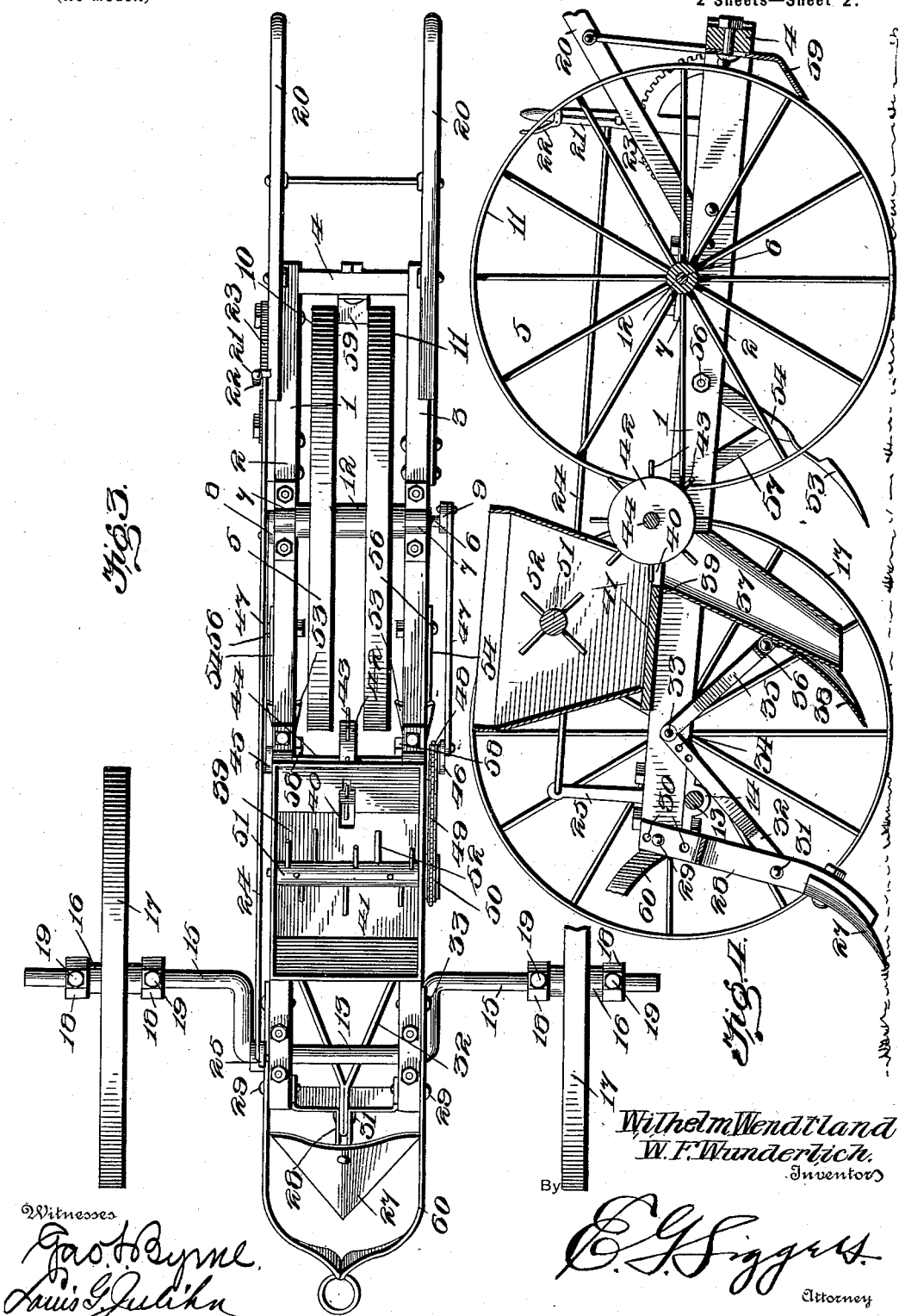

WILHELM WENDTLAND AND WILLIAM F. WUNDERLICH, OF SHINER, TEXAS.

SEED-PLANTER.

SPECIFICATION forming part of Letters Patent No. 661,750, dated November 13, 1900.

Application filed June 25, 1900. Serial No. 21,544. (No model.)

*To all whom it may concern:*

Be it known that we, WILHELM WENDTLAND and WILLIAM F. WUNDERLICH, citizens of the United States, residing at Shiner, in the county of Lavaca and State of Texas, have invented a new and useful Seed-Planter, of which the following is a specification.

Our present invention relates to improvements in seed-planters, one object in view being to produce a planter adapted for the planting of various kinds of seeds and comprising a tilting frame supporting a furrow-opener and planting mechanism operated from a supporting and driving wheel of peculiar construction mounted adjacent to the rear end of the frame and constituting the support from which the frame swings to adjust the furrow-opener.

Further objects of the invention are to provide means located at the rear end of the frame for effecting the tilting of the front end thereof and novel means for effecting relative adjustment of the front carrying-wheels and to produce certain other novel constructions contributing to the general utility of our planter.

To the accomplishment of the several objects stated and others which will more fully appear, the preferred embodiment of the invention consists in the construction and arrangement of parts to be described, illustrated in the accompanying drawings, and defined in the appended claims.

In said drawings, Figure 1 is a side elevation of our planter complete. Fig. 2 is a similar view from the opposite side, showing the front end of the frame elevated in dotted lines. Fig. 3 is a top plan view of the subject-matter of Figs. 1 and 2. Fig. 4 is a central longitudinal sectional view through the device complete.

Referring to the numerals of reference employed to designate corresponding parts in the several views, 1 indicates the frame of the machine, comprising a pair of parallel side beams 2 and 3, connected at their rear ends by a cross-bar 4 and tiltably supported at a point adjacent to its rear ends by a supporting and driving wheel 5, whose shaft 6 extends through bearings 7, mounted upon the beams 2 and 3 and is provided with terminal cranks 8 and 9. The wheel 5 is of peculiar form, in that it comprises a pair of spaced rims 10 and 11, supported by separate sets of spokes upon a common hub 12, the purpose of this particular form of wheel being to prevent the tread of the wheel from passing over the seeds deposited by the planting mechanism to be hereinafter described.

The extreme front end of the frame is supported upon a vertically-adjustable shaft or axle 13, rotatably mounted in suitable bearings 14 and having alined offset ends 15, which are supported within the hubs 16 of the front supporting-wheels 17, the diameters of which are substantially identical with the diameter of the wheel 5. The wheels 17 are designed to be adjusted laterally upon the ends 15 of the shaft 13 for the purpose of securing a wide or narrow base to accommodate the machine to various characters of service, and for this purpose hub-retaining sleeves 18 are mounted upon the shaft ends 15 in contact with the opposite ends of the hubs 16 and are adjustably fastened to the shaft by means of abutment-screws 19. It will now be seen that the elevation or depression of the shaft 13 will cause the corresponding adjustment of the front end of the frame of the machine, and in order to secure this tilting adjustment from a point at the rear end of the frame where the handles 20 are located we pivot a frame-adjusting lever 21 upon the frame at its rear extremity, said lever being provided with the usual spring-latch 22, engaging a toothed segment 23, which serves to retain the lever 21 in its adjusted positions. From the lever 21 is extended forwardly a connecting-rod 24, having a pivotal connection at its front end with a radial arm 25 extending from the shaft 13 adjacent to the outer face of the side beam 2, the arm 25 being adjustably retained upon the shaft by an abutment-screw 26, the purpose of which is to adjust the normal radial position of the arm with respect to the shaft, which adjustment determines the limits between which the front end of the frame may be moved under the impulse of the lever 21. The purpose of this tilting adjustment of the frame is to present the furrow-opener 27 and the various other ground-working implements into or out of operative proximity to the ground and to regulate the extent of the penetration in order to secure a furrow of any desired depth in accordance with the character of seeds to be planted. The opener 27 is located beyond the front end of the frame, and its shank 28 is bifurcated at its upper end for attachment to the inner faces of the beams 2 and 3, as by bolts 29, each of the bifurcations of the shank having a number of bolt-holes 30, through either of which the bolts 29 may be passed to secure the angular adjustment of the shank 28, as the latter is pivotally connected at a point intermediate of its ends—as, for instance, by a pintle 31—to the lower end of a rearwardly-extending bifurcated shank-brace 32, the rear ends of which are secured to the beams by bolts 33, from which the shank-brace swings as the shank is moved to its various adjusted positions.

Still further adjustment of the furrow-opener is accommodated by a series of bolt-openings 34 in the ends of the brace 32. The bolts 33 also serve to retain the upper ends of a pair of pendent braces 35, bolted at their lower ends to a lug 36, projecting from the front side of the pendent spout or drop-tube 37, having the usual shoe 38 at its lower end and bolted in any suitable manner to the under side of the hopper-platform 39, provided with a feed-opening 40, located adjacent to the rear wall of the seed-hopper 41, said wall being slotted above the opening 40 for the accommodation of the feed-wheel 42, the peripheral fingers 43 of which extend into the hopper and regulate the feed of seeds passing from the hopper through the spout or tube 37 for delivery into the furrow. The wheel 42 is carried by an operating-shaft 44, journaled in suitable bearings upon the platform 39 and provided with terminal cranks 45 and 46, operatively connected by connecting-rods 47 with the cranks 8 and 9 of the shaft 6. The operating-shaft 44 is also provided with a sprocket-wheel 48, geared by a sprocket-chain 49 to a second sprocket-wheel 50, keyed or otherwise secured upon the agitator-shaft 51, located within the hopper 41 and provided, as usual, with radiating fingers 52, which serve to agitate the seed within the hopper to facilitate the delivery thereof through the feed-opening 40.

In the rear of the lower end of the spout or dropper-tube 37 are located the covering-plows 53, the shanks 54 of which are provided with a series of bolt-holes 55 to permit the adjustable connection of the shanks 54 with the beams 2 and 3 of the frame, as by bolts 56, and said shanks, like the shanks 28 of the furrow-opener, are braced by forwardly-inclined shank-braces 57, adjustably connected to the beams in advance of the shanks, as by bolts 58.

59 indicates a vertically-adjustable scraper mounted at the rear end of the frame and having an angular extremity the edge of which engages the rims 10 and 11 of the wheel 5. Any suitable means for attaching the draft appliances to the frame may be provided; but we prefer to bolt the rear ends of the clevis-yoke 60 to the opposite sides of the frame-beams by the bolts 29 and 33.

The operation of our device is as follows: The shank and braces of the furrow-opener and of the covering-plows having been properly adjusted to obtain the most effective relation of said parts with respect to the shoe of the dropper-tube, the shaft-operating or frame-tilting lever 21 is swung forward to lower the shaft 13 sufficiently to present the furrow-opener to the ground. As the planter advances a furrow is opened, and the seed fed from the hopper by the rotation of the feed-wheel under the impulse of the supporting and driving wheel 5 are deposited into the furrow behind the furrow-opener and are covered by the advance of the covering-plows. The rims of the carrying and driving wheel 5 being located at opposite sides of the longitudinal center of the frame will pass at the opposite sides of the line of seeds deposited by the planter, and all danger of crushing the seeds will be obviated. If deeper planting is necessitated by the particular kind of seeds being planted, the lever 21 will be moved farther forward to effect a greater depression of the front end of the frame, any depth of furrow being readily obtained by the manipulation of this lever, and when it is desired to transport the planter from the field—as, for instance, to another point of use—the lever 21 is pulled back, which elevates the shaft 13 and raises the furrow-opener and covering-plows from the ground.

From the foregoing it will be observed that we have produced a simple and efficient planter which may be employed with equal facility for the planting of cotton, corn, and other seeds; but while the present embodiment of our invention appears at this time to be preferable we do not wish to limit ourselves to the structural details defined, but reserve the right to effect such changes, modifications, and variations, as may fall properly within the scope of the appended claims.

Having thus described our invention, what we claim, and desire to secure by Letters Patent, is—

1. In a planter, the combination with a frame supporting a hopper and a feed mechanism, of a shaft operatively connected with the feed mechanism, a supporting and driving wheel mounted upon the shaft within the frame, a shaft supporting the front extremity of the frame and provided with offset ends, wheels journaled upon said ends, and an operating device located at the rear end of the frame and operatively connected with the last-named shaft to effect the rotation of the latter and the consequent elevation or depression of the frame.

2. In a planter, the combination with a frame supporting a hopper, a dropper-tube and feed mechanism, of a shaft journaled upon the frame adjacent to its rear end and operatively connected to the feed mechanism, a supporting and driving wheel mounted upon the shaft within the frame, a shaft supporting the front extremity of the frame and provided with offset ends, wheels journaled upon said ends, an arm extending laterally from the shaft, and a lever mounted at the rear end of the frame and operatively connected with said arm.

3. In a planter, the combination with a frame comprising a pair of parallel beams, a shaft journaled upon the beams adjacent to their rear ends, a supporting and driving wheel mounted upon said shaft and having a pair of spaced rims located at opposite sides of the longitudinal center of the frame, a dropper-tube depending from the frame in advance of said wheel and in line with the space between the rims, a hopper above said tube, feed mechanism controlling the supply of seed to the tube and operated by the rotation of the supporting and driving wheel, a shaft supporting the front end of the frame and having offset ends, wheels mounted upon the offset ends of the shaft, and means for raising and lowering the shaft.

4. In a planter, the combination with a frame, a pair of longitudinal beams, and a transverse beam at the rear end thereof, of a shaft journaled upon the beams, a supporting and driving wheel mounted upon the shaft between the beams and having a pair of rims located at opposite sides of the longitudinal center of the frame, a hopper carried by the frame in advance of said wheel and having a dropper-tube depending in advance of the space between the wheel-rims, feed mechanism operated by said wheel, a shaft supporting the front end of the frame and having offset ends, wheels adjustably mounted upon said ends beyond the outer sides of the frame, and means located at the rear of the frame for elevating and depressing said shaft.

5. In a planter, the combination with a frame having a supporting-wheel at its rear end, of a shaft supporting the front end of the frame and having offset ends, wheels mounted upon the offset ends of said shaft, an arm extending from said shaft, means for effecting the adjustment of said arm with respect to the shaft, a shaft-operating lever located at the rear end of the frame and operatively connected to said arm, a furrow-opener mounted at the front end of the frame, and seed-dropping mechanism located in the rear of the furrow-opener.

6. In a planter, the combination with a frame, of a shaft journaled therein adjacent to its rear end, a single supporting and driving wheel mounted upon said shaft within the frame at the longitudinal center thereof and having a pair of spaced rims, a dropper-tube depending from the frame in advance of said wheel and in line with the space between the rims, feed mechanism controlling the supply of seed to the tube and a pair of supporting-wheels located at the front end of the planter and outside of the frame.

7. In a planter, the combination with a frame and supporting-wheels, of a furrow-opener provided with a shank, means for adjustably securing the shank to the frame to permit its longitudinal adjustment thereon, and a shank-brace pivotally connected to the shank at a point intermediate of its ends and provided with means for adjustably connecting the shank to the frame.

In testimony that we claim the foregoing as our own we have hereto affixed our signatures in the presence of two witnesses.

WILHELM WENDTLAND.
WILLIAM F. WUNDERLICH.

Witnesses:
C. L. WILLIAMS,
JOHN VALENTA.